(12) United States Patent
Kumar et al.

(10) Patent No.: US 10,657,572 B2
(45) Date of Patent: May 19, 2020

(54) METHOD AND SYSTEM FOR AUTOMATICALLY GENERATING A RESPONSE TO A USER QUERY

(71) Applicant: Wipro Limited, Bangalore (IN)

(72) Inventors: Channarayapatna Sathyanarayana Kiran Kumar, Bangalore (IN); Sawani Bade, Bangalore (IN)

(73) Assignee: Wipro Limited, Bangalore (IN)

( * ) Notice: Subject to any disclaimer, the term of this patent is extended or adjusted under 35 U.S.C. 154(b) by 431 days.

(21) Appl. No.: 15/464,106

(22) Filed: Mar. 20, 2017

(65) Prior Publication Data

US 2018/0268456 A1 Sep. 20, 2018

(30) Foreign Application Priority Data

Mar. 16, 2017 (IN) .............................. 201741009110

(51) Int. Cl.
*G06F 16/00* (2019.01)
*G06Q 30/06* (2012.01)
*G06N 5/02* (2006.01)
*G06F 16/35* (2019.01)
*G06F 16/338* (2019.01)
*G06F 16/332* (2019.01)
*G06F 16/901* (2019.01)

(52) U.S. Cl.
CPC ....... *G06Q 30/0625* (2013.01); *G06F 16/338* (2019.01); *G06F 16/3329* (2019.01); *G06F 16/35* (2019.01); *G06F 16/9024* (2019.01); *G06N 5/022* (2013.01)

(58) Field of Classification Search
CPC . G06Q 30/0625; G06F 16/35; G06F 16/3329; G06F 16/338; G06F 16/9024; G06N 5/022
USPC .......................................................... 707/759
See application file for complete search history.

(56) References Cited

U.S. PATENT DOCUMENTS

| 9,171,048 | B2 | 10/2015 | Brust et al. | |
| 2010/0063796 | A1* | 3/2010 | Rehberg | G06F 17/2785 704/9 |
| 2010/0228693 | A1* | 9/2010 | Dawson | G06F 17/2705 706/12 |
| 2012/0158633 | A1 | 6/2012 | Eder | |
| 2014/0101079 | A1 | 4/2014 | Deal | |

(Continued)

*Primary Examiner* — Monica M Pyo
(74) *Attorney, Agent, or Firm* — Finnegan, Henderson, Farabow, Garrett & Dunner, LLP (57) ABSTRACT

Disclosed subject matter relates to virtual assistance that includes a method and system for automatically generating response to a user query without language constraints. A response generating system receives the user query from a computing device associated with an end user and determines whether the user query belongs to at least one domain to determine goal data and a problem category of the user query. Further, a problem node associated with the user query is detected from problem nodes by parsing a predefined knowledge graph based on the goal data and the problem category. Furthermore, questions are provided based on problem sub-nodes of the problem node to the computing device to receive a feedback. The response to the user query extracted from the one of the problem sub-nodes is displayed to the end user based on the feedback. The present disclosure is highly scalable, reusable and requires minimal human supervision.

27 Claims, 4 Drawing Sheets

(56) References Cited

U.S. PATENT DOCUMENTS

2015/0206154 A1\* 7/2015 Lenka ................ G06Q 30/0201
705/7.29
2015/0261850 A1\* 9/2015 Mittal ................. G06F 16/3344
707/724

\* cited by examiner

METHOD AND SYSTEM FOR AUTOMATICALLY GENERATING A RESPONSE TO A USER QUERY

TECHNICAL FIELD

The present subject matter relates generally to virtual assistance, and more particularly, but not exclusively to a method and system for automatically generating a response to a user query.

BACKGROUND

Nowadays, there are a wide variety of products available in market. End users, technicians and the like, who purchase the products, may not know every feature of the products and working of every feature of the products. The users may experience difficulties in operating the products in their day to day lives. To overcome this problem, every product is associated with documents such as a user manual, frequently asked questions and the like. These documents include information related to usability of the product, troubleshooting issues related to the product, services provided for the product and the like. However, the end user may have to search through these bulky documents to find a solution to any issue that he might be facing with respect to the product. Further, there may exist same string related to an issue in multiple places of the document that makes the search process cumbersome for the end user. Due to such difficult procedure involved, the end user may call the helpdesk or walk-in to a customer care proximal to his location for resolving simple issues. However, there are instances where the customer care is shutdown or technical experts in the customer care may not be available. In few other instances, the technical experts may not be able to understand the issue to resolve. Therefore, even the technical experts may have to search through the bulky documents with a keyword constraint, thereby leading to additional difficulties in identifying the issue. In few other instances, the issue may be understood but due to complexity of the issue, assistance of the technical experts from far off locations may be required, thereby leading to delay in resolving the issue. The end user may lose interest in the product due to the hectic process of resolving the issue.

Existing techniques provide virtual helpdesks that extract keywords and synonyms of the keywords from a user query and search for a question that matches the user query exactly in a database. However, if the user query does not match any question, virtual assistance cannot be provided to the end user. In few other existing techniques, massive ontologies are utilized for understanding the user query, but these ontologies may be static that do not scale over time. Also, the existing techniques require maximum human supervision for resolving the issue.

SUMMARY

One or more shortcomings of the prior art may be overcome and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method for automatically generating a response to a user query. The method comprises receiving, by a response generating system, the user query from a computing device associated with an end user. Further, the response generating system determines whether the user query belongs to at least one domain from a plurality of predefined domains. Furthermore, when the user query belongs to the at least one domain, the response generating system determines goal data and a problem category of the user query. Upon determining the goal data and the problem category, the response generating system detects a problem node associated with the user query from one or more problem nodes by parsing a predefined knowledge graph corresponding to a category of the at least one domain, based on the goal data and the problem category. Further, the response generating system provides at least one of open-ended questions and closed-ended questions based on one or more problem sub-nodes of the problem node to the computing device to receive a feedback for at least one of the open-ended questions and the closed-ended questions from the end user. Finally, the response generating system, displays the response to the user query extracted from the one of the one or more problem sub-nodes to the end user based on the feedback.

Further, the present disclosure includes a response generating system for automatically generating a response to a user query. The response generating system comprises a processor and a memory communicatively coupled to the processor. The memory stores the processor-executable instructions, which, on execution, causes the processor to receive the user query from a computing device associated with an end user. Further, the processor determines whether the user query belongs to at least one domain from a plurality of predefined domains. Furthermore, when the user query belongs to the at least one domain, the processor determines goal data and a problem category of the user query. Upon determining the goal data and the problem category, the processor detects a problem node associated with the user query from one or more problem nodes by parsing a predefined knowledge graph corresponding to a category of the at least one domain, based on the goal data and the problem category. Further, the processor provides at least one of open-ended questions and closed-ended questions based on one or more problem sub-nodes of the problem node to the computing device to receive a feedback for at least one of the open-ended questions and the closed-ended questions from the end user. Finally, the processor, displays the response to the user query extracted from the one of the one or more problem sub-nodes to the end user based on the feedback.

Furthermore, the present disclosure relates to a non-transitory computer readable medium including instructions stored thereon that when processed by at least one processor cause a response generating system to automatically generate a response to a user query by performing operations comprising receiving the user query from a computing device associated with an end user. Upon receiving the user query, the instructions cause the response generating system to determine whether the user query belongs to at least one domain from a plurality of predefined domains. Further, when the user query belongs to the at least one domain, the instructions cause the response generating system to determine goal data and a problem category of the user query. In addition, the instructions cause the response generating system to detect a problem node associated with the user query from one or more problem nodes by parsing a predefined knowledge graph corresponding to a category of the at least one domain based on the goal data and the problem category. Furthermore, the instructions cause the response generating system to provide at least one of open-ended questions and closed-ended questions based on one or more problem sub-nodes of the problem node to the computing device to receive a feedback for at least one of the open-ended questions and the closed-ended questions from the end user. Finally, the instructions cause the response generating system to display the response to the user query extracted from one of the one or more problem sub-nodes to the end user based on the feedback.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will he appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein is a method for automatically generating a response to a user query using a response generating system. The present disclosure provides a feature wherein the end users can interact with the response generating system without language constraints. The method includes receiving, by a response generating system, the user query from a computing device associated with an end user. Further, the response generating system determines whether the user query belongs to at least one domain from a plurality of predefined domains. Furthermore, when the user query belongs to the at least one domain, the response generating system determines goal data and a problem category of the user query. Upon determining the goal data and the problem category, the response generating system detects a problem node associated with the user query from one or more problem nodes by parsing a predefined knowledge graph corresponding to a category of the at least one domain, based on the goal data and the problem category. Further, the response generating system provides at least one of open-ended questions and closed-ended questions based on one or more problem sub-nodes of the problem node to the computing device to receive a feedback for at least one of the open-ended questions and the closed-ended questions from the end user. Finally, the response generating system, displays the response to the user query extracted from the one of the one or more sub-nodes to the end user based on the feedback. The present disclosure provides a feature wherein content that is already available in user manuals and other documents can be directly used for step-by-step conversation with an end user for resolving an issue faced by the problem. Also, the present disclosure provides a 24×7 availability of personalized service desk, at a fraction of cost that may he required for maintaining human support staff for providing services. The present disclosure is highly scalable that enables reuse of enterprise help documents, troubleshooting and user manuals and standard operating procedures and other such documents to he ingested into the knowledge base with minimal human supervision and also it eliminates the tedious process of the end user waiting in a queue to be connected to a support staff for help.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may he utilized and that changes may be made without departing from the scope of the present disclosure. The following description is, therefore, not to be taken in a limiting sense.

Figure 1:
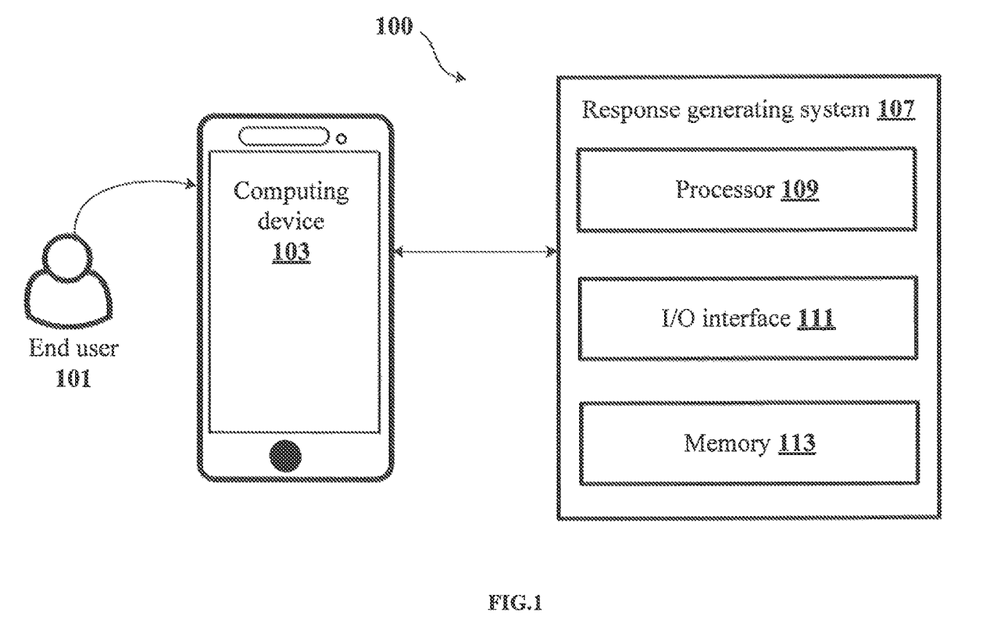
FIG. 1 shows an exemplary environment illustrating process for automatically generating a response to a user query in accordance with some embodiments of the present disclosure.

FIG. 1 shows an exemplary environment for automatically generating a response to a user query in accordance with some embodiments of the present disclosure.

The architecture 100 includes an end user 101, a computing device 103 and a response generating system 107. As an example, the end user 101 may be a customer, a consumer, a technical expert and the like. The end user 101 is associated with a computing device 103. As an example, the computing device 103 may include, but not limited to, a mobile, a laptop, a tablet and a desktop. The computing device 103 may beconfigured with a troubleshooting application or has access to a web module using which the end user 101 may interact with the response generating system 107 via a communication network (not shown in the FIG. 1). The communication network may be at least one of a wired communication network and a wireless communication network. In some embodiments, the response generating system 107 may be configured within the computing device 103. In some embodiments, the response generating system 107 may be present in a remote location.

The response generating system 107 includes a processor 109, an Input/Output (I/O) interface 111 and a memory 113. The I/O interface 111 receives a user query from the computing device 103. As an example, the user query may be related, but not limited to, at least one of features of a product, working of a product and services related to the product. In some embodiments, the user query may be in a plain text format for example in plain English. Upon receiving the user query, the processor 109 may determine at least one domain from a plurality of predefined domains to which the user query belongs. In some embodiments, the processor 109 may determine at least one domain to which the user query belongs by detecting presence of predefined domain-related words and cue representing at least one domain. As an example, the plurality of predefined domains may be cloud technology, banking, domestic products and the like. As an example, consider the user query belongs to the predefined domain "banking". The processor 109 may detect presence of the predefined domain-related words and the cue words such as transaction, account, money, funds, savings and the like. Further, the processor 109 determines goal data and a problem category of the user query if the user query belongs to at least one domain. In some embodiments, the goal data may include, but not limited to, at least one of, one or more goals present in the user query and one or more conditions affecting each of the one or more goals. In some embodiments, the one or more features may include, but not limited to, at least one of satisfying features and unsatisfying features. As an example, the problem category may include, but not limited to, a problem, an instruction, an information and a check. Upon determining the goal data and the problem category, the processor 109 may detect a problem node associated with the user query from one or more problem nodes by parsing a predefined knowledge graph corresponding to a category of at least one domain based on the goal data and the problem category. In some embodiments, the predefined knowledge graph may include, but not limited to, each of one or more problem nodes and one or more problem sub-nodes, node ID corresponding to each of the one or more problem nodes and each of the one or more problem sub-nodes and a trained problem category corresponding to each of the one or more problem nodes and each of the one or more problem sub-nodes. Upon detecting the problem node, the processor 109 may provide at least one of open-ended questions and closed-ended questions based on one or more problem sub-nodes of the problem node to the computing device 103. As an example, response for the open-ended questions may be in terms of a free text and response to the closed-ended questions may be in terms of "Yes" or "No". As an example, if the problem node associated with the user query is "laptop not powering on", then the at least one of open-ended questions and closed-ended questions may be "is the cable damaged", "is the battery damaged", "is the cable continuity damaged" and the like. The processor 109 may receive a feedback from the end user 101 for each of at least one of the open-ended questions and the closed-ended questions. In some embodiments, the at least one of the open-ended questions and the closed-ended questions are provided to the computing device 103 until one of the one or more sub-nodes comprising a response to the user query is detected based on the feedback of the end user 101. Further, based on the feedback of the end user 101, response to the user query is extracted from one of the one or more sub-nodes. In an embodiment, the response provided to the end user 101 may be stored in the memory 113 so that the next traversal in the tree is dependent on the previous response and the current user query.

Figure 2:
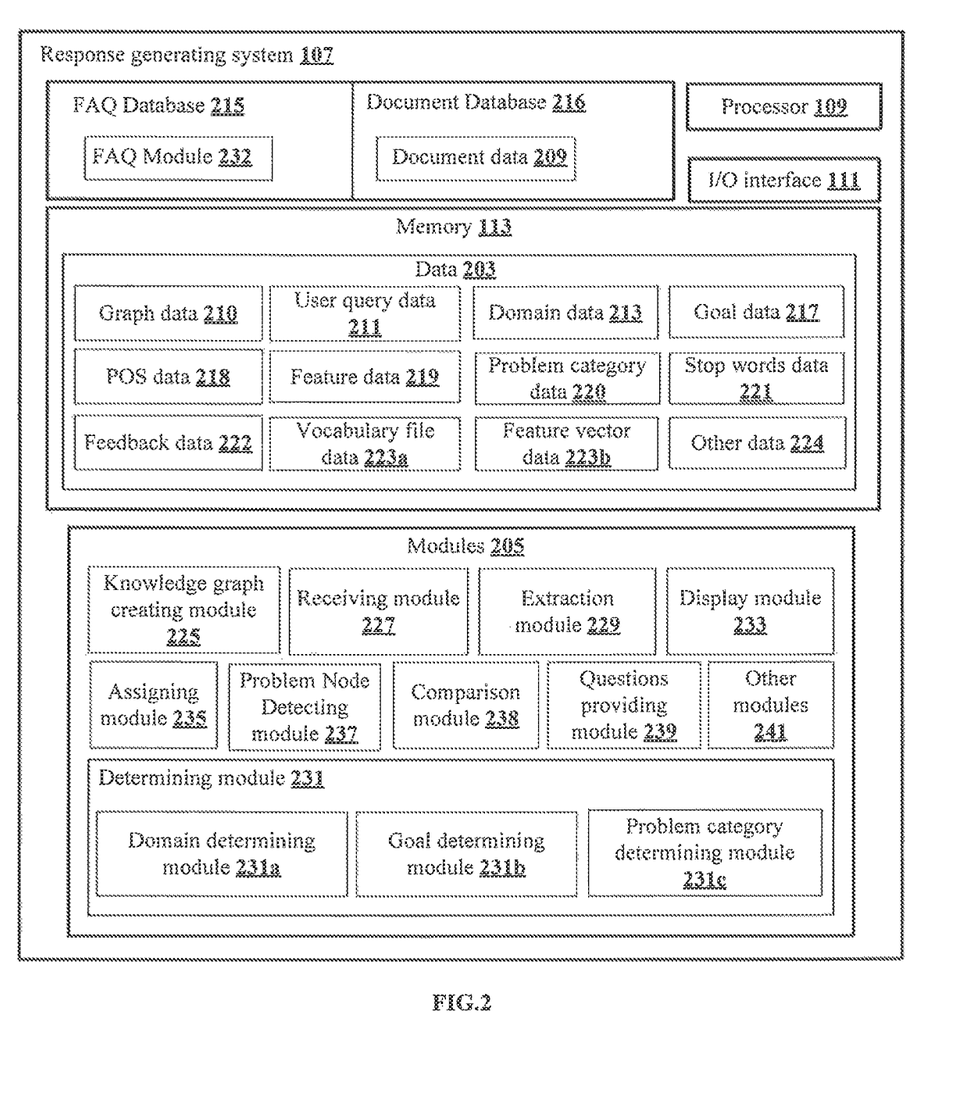
FIG. 2 shows a detailed block diagram of a response generating system for automatically generating a response to a user query in accordance with some embodiments of the present disclosure.

FIG. 2 shows a detailed block diagram of the response generating system for generating a response to a user query in accordance with some embodiments of the present disclosure.

In some implementations, the response generating system 107 may include data 203 and modules 205. As an example, the data 203 is stored in the memory 113 configured in the response generating system 107 as shown in the FIG. 2. In one embodiment, the data 203 may include a graph data 210, user query data 211, domain data 213, goal data. 217, Part-Of-Speech (POS) data 218, feature data 219, problem category data 220, stop words data 221, feedback data 222, vocabulary file data 223a, feature vector data 223b and other data 224. In the illustrated FIG. 2, modules 205 are described herein in detail.

In some embodiments, the data 203 may be stored in the memory 113 in form of various data structures. Additionally, the data 203 can be organized using data models, such as relational or hierarchical data models. The other data 224 may store data, including temporary data and temporary files, generated by the modules 205 for performing the various functions of the response generating system 107.

In some embodiments, the data stored in the memory 113 may be processed by the modules 205 of the response generating system 107. The modules 205 may be stored within the memory 113. In an example, the modules 205 communicatively coupled to a processor 109 configured in the response generating system 107, may also be present outside the memory 113 as shown in FIG. 2 and implemented as hardware. As used herein, the term modules refer to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 205 may include, for example, a knowledge graph creating module 225, receiving module 227, extraction module 229, determining module 231 including domain determining module 231a, goal determining module 231b and problem category determining module 231c, display module 233, assigning module 235, comparison module 238, questions providing module 239 and other modules 241. The other modules 241 may be used to perform various miscellaneous functionalities of the response generating system 107. It will be appreciated that such aforementioned modules 205 may be represented as a single module or a combination of different modules.

In some embodiments, the knowledge graph creating module 225 may create a predefined knowledge graph corresponding to each category of a plurality of predefined domains. The receiving module 227 may receive one or more documents from a document database 216 associated with the response generating system 107. The one or more documents received from the document database 216 may be stored as document data 209. The one or more documents may be related to one of plurality of predefined domains. As an example, the one or more documents may include, but not limited to, a user manual related to a product, Frequently Asked Questions (FAQs) related to the product, Standard Operating Procedures (SOPs) related to the product and the like. The product also may be associated with one of the plurality of predefined domains. As an example, for the predefined domain "domestic products", the product may be a washing machine, a refrigerator, a grinder, a stove and the like. As an example, for the predefined domain "cloud technology", the products may be a server, a storage unit and the like.

In some embodiments, the user manual may describe various components, interfaces, troubleshooting mechanisms and maintenance steps related to the product and services associated with the product. The user manuals are generally enterprise class documents including organized content and redundancy in terms of information about the product or services related to the product. Further, the FAQs may include generic questions related to the product or services associated with the product that may be expected from an end user 101. Further, the SOPs may be documents describing typical set of steps to be executed by the end user 101 who owns the product to achieve certain objectives. The SOPs are expected to include a finite set of diagnostic checks and recommended actions based on result of the checks. Further, the SOPs contain in detail the procedure to be followed to achieve the desired goal. The extraction module 229 may extract text from each of the one or more documents received from the document database 216. Further, the knowledge graph creating module 225 may arrange each of one or more logical units of the text in one or more problem nodes and one or more problem sub-nodes based on structure of the text. As an example, structure of the text may be decided based on font size of the text, heading levels in the text, bullet points in the text, paragraph information in the text and table including contents of the text and the like.

Furthermore, the knowledge graph creating module 225 may assign a node Identifier (ID) to each of the one or more problem nodes and the one or more problem sub-nodes. Finally, the knowledge graph creating module 225 may generate the predefined knowledge graph including each of the one or more problem nodes and the one or more problem sub-nodes, the node ID and a trained problem category corresponding to each of the one or more problem nodes and the one or more problem sub-nodes. The predefined knowledge graph for each category of the plurality of predefined domains is stored as the graph data 210. In some embodiments, the trained problem category is a problem category provided by a subject matter expert to each of the one or more problem nodes and the one or more problem sub-nodes. In some embodiments, the problem category may be generated by the knowledge graph creating module 225 without any intervention or minimal intervention from the subject matter expert. An exemplary predefined knowledge graph is shown in the below Table 1.

TABLE 1

| Node ID | Node text | Problem category |
|---------|-----------|------------------|
| 1 | Troubleshooting | Problem |
| 1.1 | Laptop not powering on | Problem |
| 1.1.1 | Please remove the battery | Instruction |
| 1.1.2 | Cable damaged | Problem |
| 1.1.2.1 | Cable continuity damaged? Please make sure you have removed battery before performing any checks | Check |
| 1.1.2.1.1 | Please replace cable | Instruction |
| 1.1.2.2 | Cable adaptor pin damaged | Check |
| 1.1.2.2.1 | Please replace cable | Instruction |
| 1.1.3 | Adaptor damaged | Problem |
| 1.1.3.1 | Adaptor cable connector pin damaged | Check |
| 1.1.3.1.1 | Please replace adaptor | Instruction |

In some embodiments, the receiving module 227 may receive a user query from a computing device 103 associated with the response generating system 107. As an example, the user query may be related, but not limited to, at least one of features of the product, working of the product and services related to the product. In some embodiments, the user query may be in a plain text format for example in plain English. The user query received from the computing device 103 may be stored as the user query data 211.

In some embodiments, the determining module 231 may include a domain determining module 231a, a goal determining module 231b and a problem category determining module 231c. The domain determining module 231a may determine whether the received user query belongs to at least one domain from a plurality of predefined domains. The domain determining module 231a may determine at least one domain to which the user query belongs by detecting presence of at least one of predefined domain-related words and cue words representing at least one domain from the plurality of predefined domains. The predefined domain-related words and the cue words may be stored as domain data 213.

In some embodiments, if the user query belongs to at least one domain, the domain determining module 231a may determine if the user query belongs to the FAQs of at least one domain based on one or more words present in the user query. If the user query is determined to be a part of the FAQs, the domain determining module 231a may transmit the user query to a FAQ module 232 associated with the response generating system 107. In some embodiments, the FAQ module 232 may be present within the response generating system 107 or it may be present external to the response generating system 107. The FAQ module 232 may fetch a response corresponding to the user query from a FAQ database 215. Upon fetching the response, the FAQ module 232 may provide the response to the display module 233. Further, the display module 233 may display the response to the end user 101 on the computing device 103.

In some embodiments, if the user query belongs to at least one domain, but is not a part of the FAQs, the goal determining module 231b may determine the goal data 217. As an example, the goal data 217 may include, but not limited to, one or more goals present in the user query and one or more features affecting each of the one or more goals. The one or more goals are main intent of the user query such as a symptom of a problem faced by the end user 101. The one or more features affecting each of the one or more goals are additional information that the end user 101 has performed to resolve the problem. As an example, the one or more features may include, but not limited to, satisfying features and unsatisfying features. In some embodiments, the satisfied features are the features that the end user 101 has successfully performed for resolving the problem and the unsatisfied features are the features that the end user 101 may have to perform for resolving the problem. As an example, consider a banking use case implementation. Consider an exemplary user query as "I would like to open an account in your bank. I have my passport as identity proof, do I need to submit any other documents?"

In the above exemplary user query, intent of the end user 01 or an issue faced by the end user 101 is "open an account in your bank". Further, satisfied condition in the exemplary user query is "my passport as identity proof" since the end user 101 already has taken a step towards resolving the issue. Furthermore, unsatisfied condition in the exemplary user query is "submit any other documents" as the end user 101 has not taken this step to resolve the issue. In some embodiments, the goal determining module 231b may obtain one or more tokens of the user query. As an example, the one or more tokens may be a word, a phrase, a sentence and the like. Further, the assigning module 335 may assign a Part-Of-Speech (PUS) tag to each of the one or more tokens indicating a POS. As an example, the one or more Parts-Of-Speech may be a Noun, a verb, a pronoun, an adjective and the like. In some embodiments, the POS tag of each of the one or more tokens is stored as POS data 218.

Furthermore, the goal determining module 231b may determine one or more features of the one or more tokens based on the POS tags assigned to each of the one or more tokens. As an example, the one or more features may include, but not limited to, position of each of the one or more tokens in the user query, presence of one or more tokens indicating at least one of the plurality of predefined domains, presence of one or more tokens indicating negation, presence of one or more tokens that provide a negative impact and presence of one or more tokens indicating context modifiers. As an example, the context modifiers may be "but" "still" "however" and the like. The one or more features may be determined and stored as feature data 219. As an example, the one or more features may he stored in a tabular format. An exemplary table indicating the one or more features of an exemplary user query "Laptop not powering on" is as shown in the below Table 2.

unsatisfied-condition, inside-unsatisfied-condition and "others". The tags may indicate part of the user query that includes the one or more goals and the one or more features. As an example, for the above Table 2, the user query is "Laptop not powering on". In this user query, the intent of the end user 101 is to power on the laptop. Since the user query includes only the intent, the goal determining module 231b may determine only the goal of the user query and not the one or more features. Therefore, the annotation may be "begin-goal".

Further, in some embodiments, the problem category determining module 231c may determine the problem category of the user query. In some embodiments, the problem category indicates a canonical form of the user query. As an example, the problem category may include, but not limited to, a problem, an instruction, an information and a check. The problem category of the user query is stored as the problem category data 220. In some embodiments, the user query annotated with the tag for each of the one or more tokens may be used as input for determining the problem category. The problem category determining module 231c may create a vocabulary tile by assigning an Identifier (ID) to each of one or more words in the user query. In some embodiments, the vocabulary file may include, but not limited to, each of the one or more words in the user query and the ID corresponding to each of one or more words in the user query. The vocabulary file of the user query may be stored as the vocabulary file data 223a. In some embodiments, the assigning module 235 may assign IDs to each of the one or more words by using the below Equation 1.

$$\{ID\ set\} = \{vocab\text{-}1 \ldots vocab\text{-}N\} + \{Comp\text{-}1 \ldots Comp\text{-}N\} + \{Range\ ID\} \quad \text{Equation 1}$$

In the above Equation 1:

Vocab-1 . . . Vocab-N include each of the one or more words in the vocabulary file.

Comp-1 . . . Comp-N include list of predefined domain-related words and cue words present in the user query.

Range ID includes ID assigned based on range of length of the user query.

N indicates the number of words in the vocabulary file.

Further, the assigning module 235 may assign a weightage for each of the one or more words in the user query. The

TABLE 2

| Current token | POS tag of the current token | POS tag of the former token | POS tag of the subsequent token | Position of the current token | Domain related | Negation | Context modifier |
|---|---|---|---|---|---|---|---|
| Laptop | Noun | — | Adverb | $1^{st}$ position | Yes | No | No |
| Not | Adverb | Noun | Verb | $2^{nd}$ position | No | Yes | No |
| Powering | Verb | Adverb | Preposition | $3^{rd}$ position | Yes | No | No |
| On | Preposition | Verb | — | $4^{th}$ position | No | No | No |

Upon analysing the one or more features of the user query, the goal determining module 231b may determine the goal data 217 based on the one or more features. Upon determining the goal data 217, the assigning module 235 may assign/annotate a tag to each of the one or more tokens in the user query based on the goal data 217. As an example, the tags may include, but not limited to, begin-goal, inside-goal, begin-satisfied-condition, inside-satisfied-condition, beginone or more words that indicate stop words may be assigned with a weightage of "0". In some embodiments, the stop words may be predefined and stored as stop words data 221. As an example, the one or more stop words may be "a", "an", "the", "to", "is", "but", "how", "or" and the like. The one or more words that contribute in a unique way such as the words that contribute in understanding gist of the user query may be assigned with a weightage of "1". Therefore, based on the weightage assigned to each of the one or more words, the problem category determining module 231c may filter the one or more words based on the weightage by removing the one or more words assigned with the weightage "0" such as the stop words from the user query. Further, by using the one or more filtered words problem category determining module 231c may determine dictionary form of the user query using a predefined technique such as a Wordnet. By determining the dictionary form of the user query, any representation of a certain user query may be understood by the problem category determining module 231c. As an example, in a scenario of printer troubleshooting, different representations of the user query "Faint print" may be "I can barely read what's printed on the sheet", "very light print", "Can hardly see anything on the printed page", "Hardly anything is visible on the printed paper", "Printer prints too light". In some embodiments, the one or more filtered words may be the one or more words that are remaining in the user query upon removing the one or more words having the weightage "0". In other words, the one or more filtered words are the one or more words of the user query assigned with the weightage "1". Further, the assigning module 235 may assign a feature vector weightage to each of the one or more filtered words based on one or more parameters to generate feature vectors. As an example, the one or more parameters may include, but not limited to, presence of predefined-domain related words and cue words representing at least one domain in the user query and range of the user query. The feature vectors of the user query may be stored as feature vector data 223b. In some embodiments, each of the one or more filtered words may be assigned with a feature vector weightage "1" if they are predefined-domain related words and the cue words. In some embodiments, if number of one or more filtered words lie in a range of 0-5, a feature vector weightage of "1" may be assigned to the each of the one or more filtered words. Similarly, if the number of one or more filtered words lie in a range of 5-10, a feature vector weightage of "2" may be assigned and so on. Further, the problem category determining module 231c may determine the problem category of the user query by comparing each of the one or more feature vectors with each of the one or more predefined feature vectors related to at least one domain of the user query.

Upon determining the goal data 217 and the problem category of the user query, the problem node detecting module 237 may detect a problem node associated with the user query. The problem node detecting module 237 may parse the predefined knowledge graph corresponding to the user query, based on the goal data 217 and the problem category. The problem node of the one or more problem nodes in the predefined knowledge graph that matches the goal data 217 and the problem category of the user query may be detected as the problem node of the user query. Upon detecting the problem node of the user query, the comparison module 238 may compare the one or more features present in the goal data 217 of the user query with one or more features present in one or more problem sub-nodes of the detected problem node in the predefined knowledge graph. Based on the comparison, if the one or more problem sub-nodes are semantically similar to the satisfied features of the one or more features of the user query, the one or more semantically similar problem sub-nodes are excluded for further processing and only rest of the one or more problem sub-nodes of the problem node are extracted for further processing performed by the questions providing module 239. Otherwise, each of the one or more problem sub-nodes of the problem node are extracted for the further processing.

In some embodiments, the questions providing module 239 provides at least one of open-ended questions and closed-ended questions to the computing device 103. In some embodiments, at least one of the open-ended questions and the closed-ended questions may be based on the one or more problem sub-nodes. As an example, response for the open-ended questions may be in terms of a free text and response to the closed-ended questions may be in terms of "Yes" or "No". In some embodiments, the questions providing module 239 may provide text present in each of the one or more problem sub-nodes as at least one of the open-ended questions and the closed-ended questions to the computing device 103 one after the other. In some embodiments, initially each of the one or more problem sub-nodes are flagged by default as "not presented". As and when at least one of the open-ended questions and the closed-ended questions are provided, the questions providing module 239 may flag the ID corresponding to the problem sub-node based on which current question is provided as "Question presented". In some embodiments, the subsequent problem sub-node is selected based on the current sub-node and feedback received from the end user 101 for the current question. The same pattern of flagging may continue until one of the one or more problem sub-nodes including a response to the user query is detected based on the feedback of the end user 101 or until the problem sub-nodes flagged as "not presented" may get exhausted and the display module 233 displays a message indicating "no more questions to present". Further, the questions providing module 239 may provide an option on the computing device 103 for the end user 101 to provide feedback in terms of "successful or Yes" and "not successful or No" for open-ended questions such as questions that may involve performing check actions by the end user 101. Further, for the closed-ended questions such as questions seeking information from the end user 101, the end user 101 may provide the feedback in plain text. The receiving module 227 may receive a feedback of the end user 101 for each of at least one of the open-ended questions and the closed-ended questions provided to the computing device 103. The feedback of the end user 101 is stored as the feedback data 222. If the feedback of the end user 101 is "Successful or Yes", the display module 233 may display the response to the user query extracted from one of the one or more problem sub-nodes for which the feedback of "Successful or Yes" is received, to the end user 101. Further, if the feedback of the end user 101 is "Successful or Yes", the questions providing module 239 prompts the end user 101 to state whether the end user 101 is "satisfied" or "dissatisfied" with the response. If the feedback of the end user 101 is "Not successful or No", the questions providing module 239 provides more questions to the computing device 103 until one of the one or more problem sub-nodes including the response to the user query is detected based on the feedback of the end user 101 or until the problem sub-nodes flagged as "not presented" may get exhausted and the display module 233 displays the message indicating "no more questions to present". In some embodiments, if the response to the user query is not detected based on the feedback of the end user 101 after the display module 233 displays the message indicating "no more questions to present", the display module 233 further may display a message prompting the end user 101 to rephrase the user query.

As an example, consider the Table 1 given below of the exemplary predefined knowledge graph.

TABLE 1

| Node ID | Node text | Problem category |
| --- | --- | --- |
| 1 | Troubleshooting | Problem |
| 1.1 | Laptop not powering on | Problem |
| 1.1.1 | Please remove the battery | Instruction |
| 1.1.2 | Cable damaged | Problem |
| 1.1.2.1 | Cable continuity damaged? Please make sure you have removed battery before performing any checks | Check |
| 1.1.2.1.1 | Please replace cable | Instruction |
| 1.1.2.2 | Cable adaptor pin damaged | Check |
| 1.1.2.2.1 | Please replace cable | Instruction |
| 1.1.3 | Adaptor damaged | Problem |
| 1.1.3.1 | Adaptor cable connector pin damaged | Check |
| 1.1.3.1.1 | Please replace adaptor | Instruction |

Consider that the problem node detected for an exemplary user query is "Laptop not powering on" having the ID "1.1". The satisfying condition present in the exemplary user query may be "Battery removed" which is semantically similar to "please remove the battery" as indicated by ID "1.1.1". Therefore, the problem sub-node indicated by ID "1.1.1" is excluded for providing questions to the computing device 103. A first open-ended question provided to the computing device 103 may be "check if cable is damaged" based on problem sub-node having ID "1.1.2". The flag of "not presented" changes to "question presented" for this problem sub-node. The receiving module 227 may receive the feedback from the end user 101 as "No". Since the feedback received is "No", the questions providing module 239 may continue by providing a subsequent open-ended question from a same level. As an alternative, the receiving module 227 may receive the feedback from the end user 101 as "cable is not damaged" for the question "check if cable is damaged". Thus, response to the open-ended question may be an affirmative or not. The subsequent open-ended question may be based on the problem sub-node "1.1.3", "check if the adaptor is damaged". The flag of "not presented" changes to "question presented" for this problem sub-node. The receiving module 227 may receive the feedback from the end user 101 as "Yes". Since the feedback received is "Yes", the questions providing module 239 may continue by providing a subsequent open-ended question from the subsequent level. The subsequent open-ended question may be based on the problem sub-node "1.1.3.1", "check if adaptor cable connector pin is damaged". The flag of "not presented" changes to "question presented" for this problem sub-node. The receiving module 227 may receive the feedback from the end user 101 as "Yes". Since the feedback received is "Yes", the questions providing module 239 may continue by providing a subsequent open-ended question from the subsequent level. The subsequent open-ended question may be based on the problem sub-node "1.1.3.1", "check if adaptor cable connector pin is damaged". The flag of "not presented" changes to "question presented" far this problem sub-node. The receiving module 227 may receive the feedback from the end user 101 as "Yes". Since the feedback received is "Yes", the questions providing module 239 may continue to the subsequent level. The text present in the problem sub-node of the subsequent level having the ID "1.1.3.1.1" is an instruction "please replace the adaptor". Therefore, since the response to the exemplary user query is detected in the problem sub-node "1.1.3.1.1", the questions providing module 239 stops providing questions to the computing device 103 and prompts the end user 101 to state whether he is satisfied or dissatisfied by the response.

In some embodiments, if the user query does not belong to at least one domain of the plurality of predefined domains, the response generating system 107 discards the user query. Further, the display module 233 may display a message to the end user 101 on the computing device 103 indicating "User query not relevant to domain. Kindly rephrase the user query".

Figure 3:
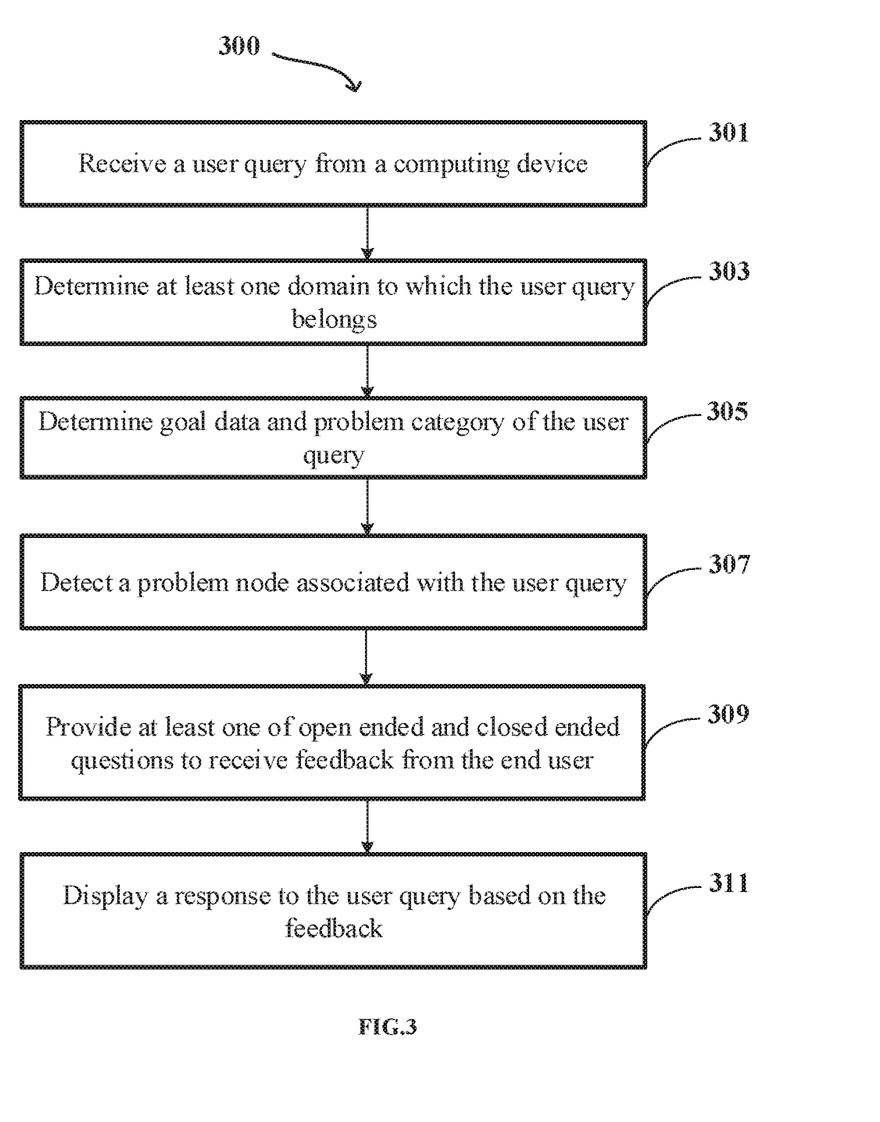
FIG. 3 shows a flowchart illustrating a method for automatically generating a response to a user query in accordance with some embodiments of the present disclosure.

FIG. 3 shows a flowchart illustrating a method for automatically generating a response to a user query in accordance with some embodiments of the present disclosure.

As illustrated in FIG. 3, the method 300 includes one or more blocks illustrating a method for automatically generating a response to a user query. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include receiving, by a processor 109 of the response generating system 107, the user query from a computing device 103 associated with an end user 101. As an example, the user query may be related, but not limited to, at least one of features of a product, working of a product and services related to the product.

At block 303, the method 300 may include determining, by the processor 109, at least one domain from a plurality of predefined domains to which the user query belongs. In some embodiments, the processor 109 may determine at least one domain to which the user query belongs by detecting presence of predefined domain-related words and cue representing at least one domain.

At block 305, the method 300 may include, determining, by the processor 109, goal data 217 and a problem category of the user query, when the user query belongs to the at least one domain. In some embodiments, the goal data may include, but not limited to, at least one of, one or more goals present in the user query and one or more features affecting each of the one or more goals. In some embodiments, the one or more features may include, but not limited to, at least one of satisfying features and unsatisfying features.

At block 307, the method 300 may include, detecting, by the processor 109, a problem node associated with the user query from one or more problem nodes by parsing a predefined knowledge graph corresponding to a category of the at least one domain, based on the goal data and the problem category. In some embodiments, the predefined knowledge graph may include, but not limited to, each of one or more problem nodes and one or more problem sub-nodes, node Identifier (ID) corresponding to each of the one or more problem nodes and each of the one or more problem sub-nodes and a trained problem category corresponding to each of the one or more one or more problem nodes and each of the one or more problem sub-nodes.

At block 309, the method 300 may include, providing, by the processor 109, at least one of open-ended questions and closed-ended questions based on one or more problem sub-nodes of the problem node to the computing device 103. As an example, response for the open-ended questions may be in terms of a free text and response to the closed-ended questions may be in terms of "Yes" or "No". The processor 109 receives a feedback from the end user 101 for each of at least one of the open-ended questions and the closed-ended questions.

At block 311, the method 300 may include, displaying, by the processor 109 the response to the user query extracted from one of the one or more problem sub-nodes to the end user 101 based on the feedback.

Figure 4:
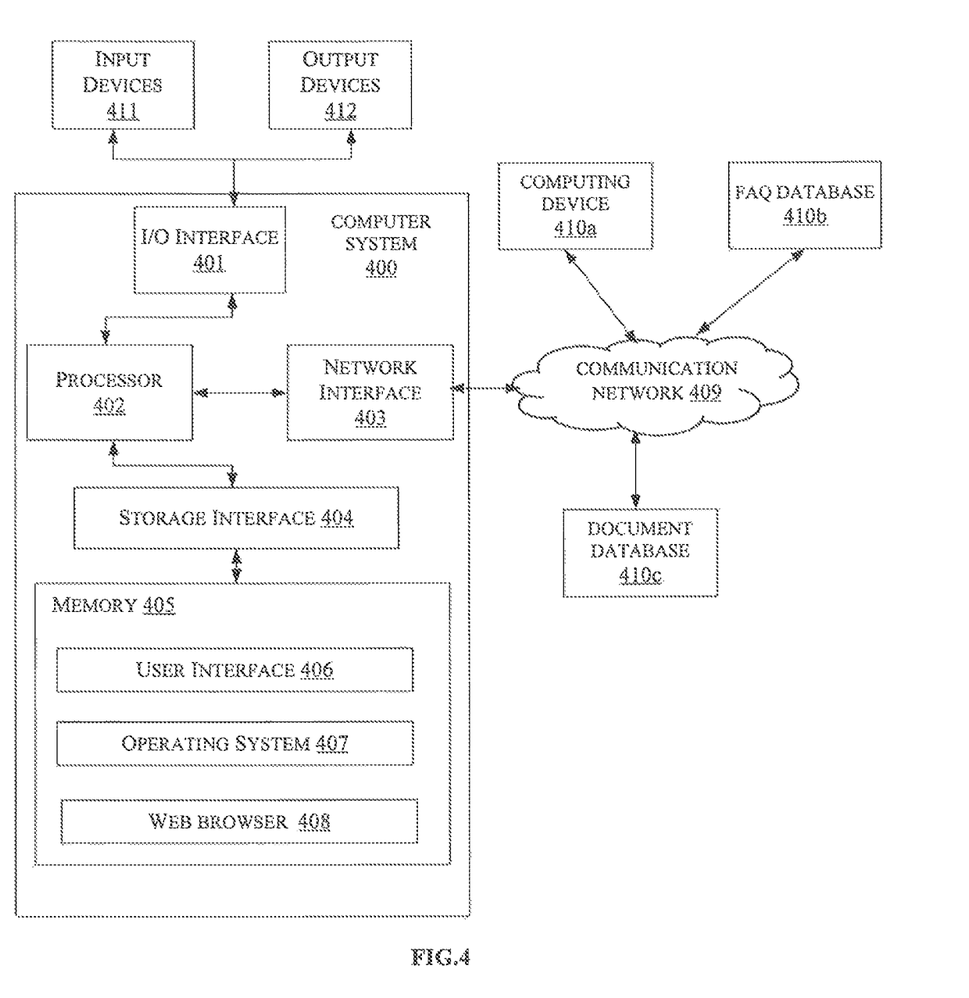
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, FIG. 4 illustrates a block diagram of an exemplary computer system 400 for implementing embodiments consistent with the present invention. In an embodiment, the computer system 400 can be response generating system 107 that is used for automatically generating a response to a user query. The computer system 400 may include a central processing unit ("CPU" or "processor") 402. The processor 402 may include at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n /b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with a computing device 410*a*, a Frequently asked questions (FAQs) database 410*b* and a document database 410*c*. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The compuuting device 410*a* may include, but not limited to, a mobile, a laptop, a tablet and a desktop. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-star drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, strollers, windows, widgets, etc. Graphical User Interfaces (GUIs) may he employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 400 may implement the web browser 408 stored program components. The web browser 408 may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the Embodiment of the Present Disclosure are Illustrated Herein In an embodiment, the present disclosure provides a method and a system for automatically generating a response to a user query.

The present disclosure provides a feature wherein content that is already available in user manuals and other documents can be directly used for step-by-step conversation with an end user for resolving an issue faced by the problem.

The present disclosure provides a feature wherein a right problem category of the user query can be identified, when the user query has a goal and satisfied condition (or action already performed by the user).

The present disclosure provides a 24×7 availability of personalized service desk, at a fraction of cost that may be required for maintaining human support staff for providing services.

The present disclosure provides a feature wherein the end users can interact with the response generating system without language constraints and also it eliminates the tedious process of the end user waiting in a queue to be connected to a support staff for help.

The present disclosure is highly scalable that enables reuse of enterprise help documents, troubleshooting and user manuals and standard operating procedures and other such documents to be ingested into the knowledge base with minimal human supervision.

A description of an embodiment with several components in communication with each other does not imply that all such components are required. On the contrary, a variety of optional components are described to illustrate the wide variety of possible embodiments of the invention.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for automatically generating a response to a user query. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention he limited not by this detailed description, but rather by any claims that issue on an application based here on. Accordingly, the embodiments of the present invention are intended to be illustrative, but not limiting, of the scope of the invention, which is set forth in the following claims.

| Referral numerals | |
| --- | --- |
| Reference Number | Description |
| 100 | Environment |
| 101 | End user |
| 103 | Computing device |
| 107 | Response generating system |
| 109 | Processor |
| 111 | I/O interface |
| 113 | Memory |
| 203 | Data |
| 205 | Modules |
| 210 | Graph data |
| 211 | User query data |
| 213 | Domain data |
| 217 | Goal data |
| 218 | POS data |
| 219 | Feature data |
| 220 | Problem category data |
| 221 | Stop words data |
| 222 | Feedback data |
| 223a | Vocabulary file data |
| 223b | Feature vector data |
| 224 | Other data |
| 225 | Knowledge graph creating module |
| 227 | Receiving module |
| 229 | Extraction module |
| 231 | Determining module |
| 231a | Domain determining module |
| 231b | Goal determining module |

-continued

| Referral numerals | |
|---|---|
| Reference Number | Description |
| 231c | Problem category determining module |
| 233 | Display module |
| 235 | Assigning module |
| 238 | Comparison module |
| 239 | Questions providing module |
| 241 | Other modules |

What is claimed:

1. A method for automatically generating a response to a user query, the method comprising:
    receiving, by a response generating system, the user query from a computing device associated with an end user;
    determining, by the response generating system, whether the user query belongs to at least one domain from a plurality of predefined domains;
    determining, when the user query belongs to the at least one domain, by the response generating system, goal data and a problem category of the user query, wherein determining the goal data comprises determining one or more features of one or more tokens based on Part-Of-Speech (POS) tags, wherein the one or more features comprise satisfying features that indicate steps successfully performed by the end user for resolving a problem;
    detecting, by the response generating system, a problem node and one or more problem sub-nodes associated with the user query by parsing a predefined knowledge graph corresponding to a category of the at least one domain, based on the goal data and the problem category;
    comparing, by the response generating system, each of the one or more problem sub-nodes with the satisfying features for semantic similarity;
    removing, upon comparison, by the response generating system, the one or more problem sub-nodes that are semantically similar to the satisfying features;
    providing, upon removal, by the response generating system, at least one of open-ended questions and closed-ended questions based on the one or more problem sub-nodes of the problem node to the computing device to receive a feedback for at least one of the open-ended questions and the closed-ended questions from the end user; and
    displaying, by the response generating system, the response to the user query extracted from one of the one or more problem sub-nodes to the end user based on the feedback;
    wherein determining the problem category comprises:
        creating, by the response generating system, a vocabulary file comprising each of one or more words in the user query and an Identifier (ID) corresponding to each of one or more words in the user query;
        assigning, by the response generating system a weightage for each of the one or more words in the user query;
        filtering, by the response generating system, the one or more words from the user query based on the weightage;
        generating, by the response generating system, one or more feature vectors by assigning a feature vector weightage to each of the one or more filtered words based on one or more parameters; and
        comparing, by the response generating system, each of the one or more feature vectors with each of the one or more predefined feature vectors related to the at least one domain to determine the problem category.

2. The method as claimed in claim 1, wherein the user query is related to at least one of features of a product, working of a product and services related to the product.

3. The method as claimed in claim 1, wherein determining the at least one domain to which the user query belongs, comprises detecting presence of at least one of predefined domain-related words and cue words representing the at least one domain.

4. The method as claimed in claim 1, wherein determining the goal data comprises:
    obtaining, by the response generating system, one or more tokens from the user query;
    assigning, by the response generating system, a POS tag to each of the one or more tokens;
    determining, by the response generating system, the goal data based on the one or more features of the one or more tokens, wherein the goal data comprises at least one of, one or more goals present in the user query and one or more features affecting each of the one or more goals.

5. The method as claimed in claim 1, wherein the one or more features comprises at least one of position of each of the one or more tokens in the user query, presence of one or more tokens indicating at least one of the plurality of predefined domains, presence of one or more tokens indicating negation, presence of one or more tokens that provide a negative impact and presence of one or more tokens indicating context modifiers.

6. The method as claimed in claim 1, wherein the one or more features further comprises unsatisfying features.

7. The method as claimed in claim 1, further comprises annotating, by the response generation system, a tag to each of the one or more tokens in the user query based on the goal data.

8. The method as claimed in claim 1, wherein the problem category of the user query is at least one of a problem, an information, an instruction and a check.

9. The method as claimed in claim 1, wherein the one or more parameters comprise at least one of presence of predefined-domain related words and cue words representing the at least one domain in the user query and range of the user query.

10. The method as claimed in claim 1, wherein the one or more problem sub-nodes of the problem node are selected based on the goal data.

11. The method as claimed in claim 1, wherein the at least one of the open-ended questions and the closed-ended questions are provided to the computing device until one of the one or more problem sub-nodes comprising a response to the user query is detected based on the feedback of the end user.

12. The method as claimed in claim 1 further comprises prompting, by the response generation system, the end user to rephrase the user query, if the one of the one or more problem sub-nodes comprising the response is not detected.

13. The method as claimed in claim 1 further comprises generating the predefined knowledge graph by:
    extracting, by the response generating system, text from each of one or more documents received from a document database, wherein each of the one or more documents are related to the predefined domain;
    arranging, by the response generating system, each of one or more logical units of the text in the one or more problem nodes and the one or more problem sub-nodes based on structure of the text;

assigning, by the response generating system, a node Identifier (ID) to each of the one or more problem nodes and the one or more problem sub-nodes; and generating, by the response generation system, the predefined knowledge graph comprising each of the one or more problem nodes and the one or more problem sub-nodes, the node ID and a trained problem category corresponding to each of the one or more problem nodes and the one or more problem sub-nodes.

14. A response generating system for automatically generating a response to a user query, the response generating system comprising:

a processor; and a memory communicatively coupled to the processor, wherein the memory stores the processor-executable instructions, which, on execution, causes the processor to:

receive the user query from a computing device associated with an end user;

determine whether the user query belongs to at least one domain from a plurality of predefined domains;

determine, when the user query belongs to the at least one domain, by the response generating system, goal data and a problem category of the user query, wherein determining the goal data comprises determining one or more features of one or more tokens based on Part-Of-Speech (POS) tags, wherein the one or more features comprise satisfying features that indicate steps successfully performed by the end user for resolving a problem;

detect a problem node and one or more problem sub-nodes associated with the user query by parsing a predefined knowledge graph corresponding to a category of the at least one domain, based on the goal data and the problem category;

compare each of the one or more problem sub-nodes with the satisfying features for semantic similarity;

remove, upon comparison, the one or more problem sub-nodes that are semantically similar to the satisfying features;

provide, upon removal, at least one of open-ended questions and closed-ended questions based on the one or more problem sub-nodes of the problem node to the computing device to receive a feedback for at least one of the open-ended questions and the closed-ended questions from the end user; and display the response to the user query extracted from one of the one or more problem sub-nodes to the end user based on the feedback;

wherein to determine the problem category, the instructions cause the processor to:

create a vocabulary file comprising each of one or more words in the user query and an Identifier (ID) corresponding to each of one or more words in the user query;

assign a weightage for each of the one or more words in the user query;

filter the one or more words from the user query based on the weightage;

generate one or more feature vectors by assigning a feature vector weightage to each of the one or more filtered words based on one or more parameters; and compare each of the one or more feature vectors with each of the one or more predefined feature vectors related to the at least one domain to determine the problem category.

15. The response generating system as claimed in claim 14, wherein the user query is related to at least one of features of a product, working of a product and services related to the product.

16. The response generating system as claimed in claim 14, wherein the processor determines the at least one domain to which the user query belongs, by detecting presence of at least one of predefined domain-related words and cue words representing the at least one domain.

17. The response generating system as claimed in claim 14, wherein to determine the goal data, instructions cause the processor to:

obtain one or more tokens from the user query;

assign a POS tag to each of the one or more tokens; and determine the goal data based on the one or more features of the one or more tokens, wherein the goal data comprises at least one of, one or more goals present in the user query and one or more features affecting each of the one or more goals.

18. The response generating system as claimed in claim 14, wherein the one or more features comprises at least one of position of each of the one or more tokens in the user query, presence of one or more tokens indicating at least one of the plurality of predefined domains, presence of one or more tokens indicating negation, presence of one or more tokens that provide a negative impact and presence of one or more tokens indicating context modifiers.

19. The response generating system as claimed in claim 14, wherein the one or more features further comprises unsatisfying features.

20. The response generating system as claimed in claim 14, wherein the processor is further configured to annotate a tag to each of the one or more tokens in the user query based on the goal data.

21. The response generating system as claimed in claim 14, wherein the problem category of the user query is at least one of a problem, an information, an instruction and a check.

22. The response generating system as claimed in 14, wherein the one or more parameters comprise at least one of presence of predefined-domain related words and cue words representing the at least one domain in the user query and range of the user query.

23. The response generating system as claimed in claim 14, wherein the one or more problem sub-nodes of the problem node are selected based on the goal data.

24. The response generating system as claimed in claim 14, wherein the processor provides at least one of the open-ended questions and the closed-ended questions to the computing device until one of the one or more problem sub-nodes comprising a response to the user query is detected based on the feedback of the end user.

25. The response generating system as claimed in claim 14, wherein the processor is further configured to prompt the end user to rephrase the user query, if the one of the one or more problem sub-nodes comprising the response is not detected.

26. The response generating system as claimed in claim 14, wherein to generate the predefined knowledge graph, the instructions cause the processor to:

extract text from each of one or more documents received from a document database, wherein each of the one or more documents are related to the predefined domain;

arrange each of one or more logical units of the text in the one or more problem nodes and the one or more problem sub-nodes based on structure of the text;

assign a node Identifier (ID) to each of the one or more problem nodes and the one or more problem sub-nodes; and generate the predefined knowledge graph comprising each of the one or more problem nodes and the one or more problem sub-nodes, the node ID and a trained problem category corresponding to each of the one or more problem nodes and the one or more problem sub-nodes.

27. A non-transitory computer readable medium including instructions stored thereon that when processed by at least one processor cause a response generating system to automatically generate a response to a user query by performing operations comprising:

receiving the user query from a computing device associated with an end user;

determining whether the user query belongs to at least one domain from a plurality of predefined domains;

determining when the user query belongs to the at least one domain, by the response generating system, goal data and a problem category of the user query, wherein determining the goal data comprises determining one or more features of one or more tokens based on Part-Of-Speech (POS) tags, wherein the one or more features comprise satisfying features that indicate steps successfully performed by the end user for resolving a problem ;

detecting a problem node and one or more problem sub-nodes associated with the user query by parsing a predefined knowledge graph corresponding to a category of the at least one domain, based on the goal data and the problem category;

comparing each of the one or more problem sub-nodes with the satisfying features for semantic similarity;

removing, upon comparison, the one or more problem sub-nodes that are semantically similar to the satisfying features;

providing, upon removal, at least one of open-ended questions and closed-ended questions based on the one or more problem sub-nodes of the problem node to the computing device to receive a feedback for at least one of the open-ended questions and the closed-ended questions from the end user; and displaying the response to the user query extracted from one of the one or more problem sub-nodes to the end user based on the feedback;

wherein to determining the problem category comprises:

creating a vocabulary file comprising each of one or more words in the user query and an Identifier (ID) corresponding to each of one or more words in the user query;

assigning a weightage for each of the one or more words in the user query;

filtering the one or more words from the user query based on the weightage;

generating one or more feature vectors by assigning a feature vector weightage to each of the one or more filtered words based on one or more parameters; and comparing each of the one or more feature vectors with each of the one or more predefined feature vectors related to the at least one domain to determine the problem category.

* * * * *